(12) United States Patent
Kim

(10) Patent No.: US 7,693,390 B2
(45) Date of Patent: Apr. 6, 2010

(54) APPARATUS FOR CONTROLLING ANGLE OF AV FRONT PANEL FOR AUTOMOBILE

(75) Inventor: Kyung Wook Kim, Ichon-Si (KR)

(73) Assignee: Hyundai Autonet Co., Ltd. (KR)

( * ) Notice: Subject to any disclaimer, the term of this patent is extended or adjusted under 35 U.S.C. 154(b) by 2413 days.

(21) Appl. No.: 09/901,069

(22) Filed: Jul. 10, 2001

(65) Prior Publication Data

US 2002/0005897 A1 Jan. 17, 2002

(30) Foreign Application Priority Data

Jul. 11, 2000 (KR) ................................ 2000-39534

(51) Int. Cl.
*H04N 5/91* (2006.01)
*H04N 7/18* (2006.01)
(52) U.S. Cl. .......................................... 386/46; 348/148
(58) Field of Classification Search ....................... None
See application file for complete search history.

(56) References Cited

U.S. PATENT DOCUMENTS

| 5,177,730 | A | * | 1/1993 | Utsugi | .......................... 720/646 |
| 5,762,412 | A | * | 6/1998 | Kim | .......................... 312/319.2 |
| 5,982,637 | A | * | 11/1999 | Noguchi | .......................... 361/814 |
| 6,747,364 | B1 | * | 6/2004 | Shibuya et al. | .......................... 307/9.1 |

* cited by examiner

*Primary Examiner*—Thai Tran
*Assistant Examiner*—Heather R Jones
(74) *Attorney, Agent, or Firm*—NSIP Law

(57) ABSTRACT

An apparatus for controlling inclined angle of an AV front panel for automobile is disclosed. Rotating force from a motor is transmitted to a rack attached to a slide plate through a power transmission system, and the slide plate is thus extended outward. The outer end of the slide plate pushes a lower part of the front panel, and the upper part of the front panel is lowered along a trajectory guide. Thereafter, rotating force from a second motor is transmitted to a sector gear through a second power transmission system. The rotation of the sector gear causes an end of an arm link to be lowered, thereby allowing the upper part to exit from an opening of the trajectory guide. As the upper part of the front panel is lowered, the front panel is laid down to be accessed therein.

11 Claims, 10 Drawing Sheets

APPARATUS FOR CONTROLLING ANGLE OF AV FRONT PANEL FOR AUTOMOBILE

BACKGROUND OF THE INVENTION

1. Field of the Invention

The present invention relates to an apparatus for controlling inclined angle of an AV(Audio/Video) front panel for automobile, and, more particularly, to an apparatus for controlling inclined angle of an AV front panel for automobile which is additionally equipped with means for opening and closing the front panel employing a mechanical link device so as to enable the front panel to be varied in the inclined angle and to be opened and closed, thereby improving its visual recognition, and which employs two deck mechanisms to load and unload a recording medium.

2. Description of the Prior Art

As is commonly known, a car audio set, which is mounted on an automobile, in general has an integrated combination of a radio receiving set for giving radio broadcast service and a cassette player for playing back a cassette tape, and which is positioned at a portion ahead of a driver to allowing the driver to manipulate it with ease even though the driver is in the driving state.

This type of car audio set is in recent years developed into an integrated combination with a compact disc player for playing back data such as music data recorded on a compact disk with high quality.

Furthermore, it is also necessary to set up a display screen of a car navigation system inside an automobile, which is intended to give a driver information for guiding him to his destination while the driver is driving and listening information from the car audio set.

Therefore, the front panel of a conventional car audio set is equipped with a liquid crystal display, and a cassette player, a compact disc player of a car audio, or a combination of both players is installed inside the front panel such that a driver can control an inclined angle of the front panel into a desired angle while looking the liquid crystal display screen and can load or unload a cassette tape into the cassette player.

As illustrated in FIG. 1, this type of apparatus for controlling the front panel of a car audio set has a depression 1B formed on a side of the back surface of the front panel 1. The depression is provided at its bottom side with an opening groove 1A.

An escutcheon 2, to which the front panel 1 is coupled, is provided with a projecting bar 5A intended to be inserted into the depression 1B.

A projecting stem 5, which is connected to the projecting bar 5A, is provided at the back surface such that the projecting bar 5A is capable of hinge movement from side to side. The hinge movement of the projecting bar 5A can be achieved by a pusher 4 in such a way that the pusher 4 is in close contact with and presses the projecting stem 5 against elasticity of a spring 6. The front panel 1 is placed in front of the escutcheon 2 with the depression 1B joined to the escutcheon, so that the front panel 1 is connected to a main body to enable the driver to use the car audio set.

When it is necessary to uncouple the front panel from the main body, a release knob 3, which is provided at a side of the front surface for the front panel 1, is pushed into the front panel 1, and then a pin 3A connected to the release knob 3A is protruded from the back surface of the front panel 1 to press the pusher 4. With the pusher 4 being pressed, the projecting bar 5A is moved toward the opening groove 1A against the elasticity of the spring 6, so that the projecting bar 5A is released from the opening groove 1A, thereby allowing the front panel 1 to be uncoupled from the escutcheon 2.

Since the above-mentioned coupling apparatus is however constructed such that the front panel 1 is coupled to the escutcheon 2 by means of only one projecting bar 5A, the front panel 1 coupled to the escutcheon 2 is vibrated owing to the unstable coupling while driving a car. When the vibration is very intensive, the front panel 1 is separated from the escutcheon 2 drops to the bottom surface of the automobile, thereby causing the front panel 1 to be damaged or the driver to be unsettled. Since fitting components placed at the back surface of the escutcheon 2 are also made from metal material, it is required to carry out press working in manufacturing of the components, thereby causing its production cost to be increased. In addition to that, since it is required to fasten the components by screws one by one, working efficiency comes down.

In order to overcome the above-mentioned problems, an apparatus for coupling detachably a front panel of a car audio set has been suggested in Korean Patent No. 20-147220 issued on Mar. 8, 1999, in which a front panel is coupled at its both sides to an escutcheon by action of a coupling unit having two engaging protrusions being fitted in the escutcheon, so that the front panel can be stably mounted on the escutcheon, thereby preventing vibration of the front panel during driving of the automobile having the coupling unit. Furthermore, the Korean patent has advantage in that the coupling unit is formed of plastic material, thereby cutting back on its production cost.

Referring to FIG. 2 showing the Korean patent, upon pushing a release knob 13 disposed on the front panel 11, a motor 14 rotates in one direction to transmit its driving force to gears 15, 16 engaged with each other.

Then, a rack 17, which is engaged with the gear 16, is moved forward by the rotation of the gear 16, causing a slide plate 18 having the rack 17 to be slide forward, so that the inclined angle of the front panel 11 can be controlled depending on the slide movement of the slide plate 18 within the range of an angle control 9.

When the release knob 13 is again pushed, i.e. turned on in the outermost state of the front panel 11, the motor 14 rotates in the reverse direction to retract the slide plate 18, thereby causing the front panel 11 to be closed.

However, the above-mentioned conventional AV front panel for automobile has problems in that since the above structure is limited in the spatial expanding range, the car audio set having the front panel can employ only one type of recording medium, and thus the car audio set must depend on input of another external player when another recording medium is played back.

SUMMARY OF THE INVENTION

Accordingly, the present invention has been made keeping in mind the above problems occurring in the prior art, and an object of the present invention is to provide an apparatus for controlling inclined angle of an AV front panel for automobile which is additionally equipped with a mechanical link device for enabling a screen to be varied in the inclined angle and to be opened and closed to improve visual recognition, and which employs two deck mechanisms to load and unload a recording medium.

In order to accomplish the above object, the present invention provides an apparatus for controlling inclined angle of an AV front panel for automobile comprising means for inclining the front panel without a separate trajectory for inclining of the front panel;

means for transmitting rotating force of a motor to the inclining means for the sake of inclination of the front panel;

means for converting rotating movement of a motor into horizontal linear movement when controlling inclination angle of the front panel; and means for opening and closing the front panel as a result of the action of the inclining means, the transmitting means and the converting means.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
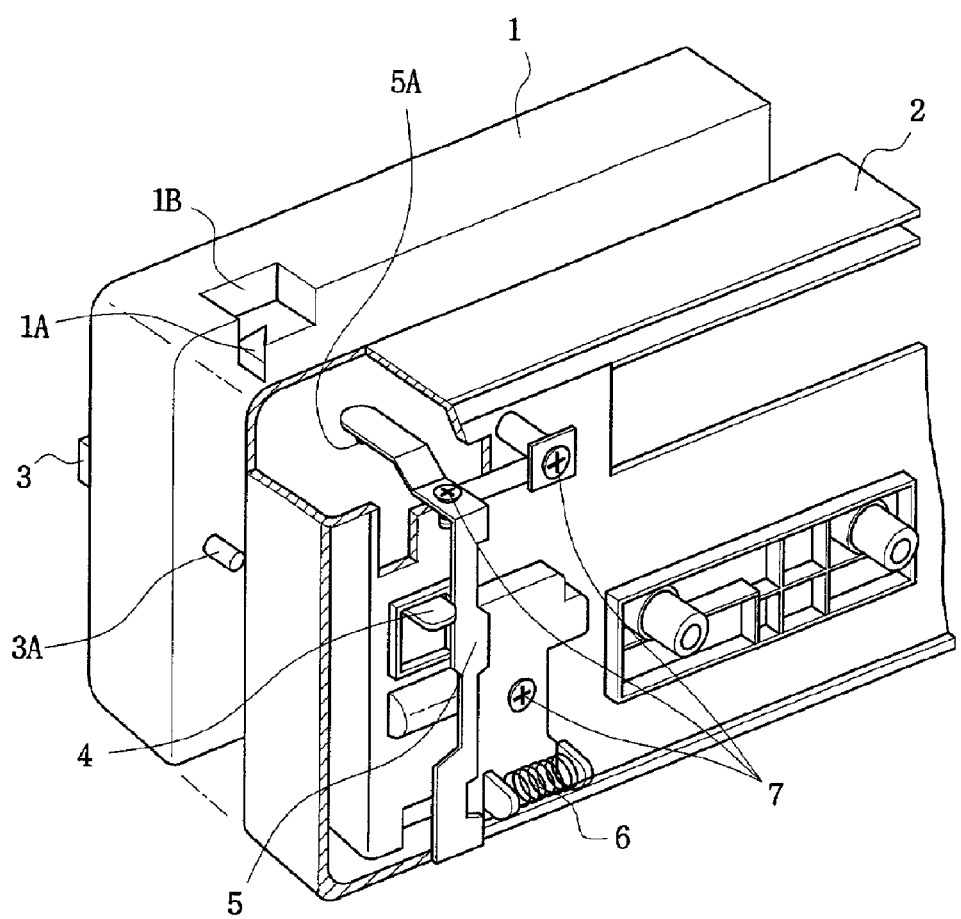
FIG. 1 is a perspective view showing a front panel of a conventional car audio set.
Figure 2:
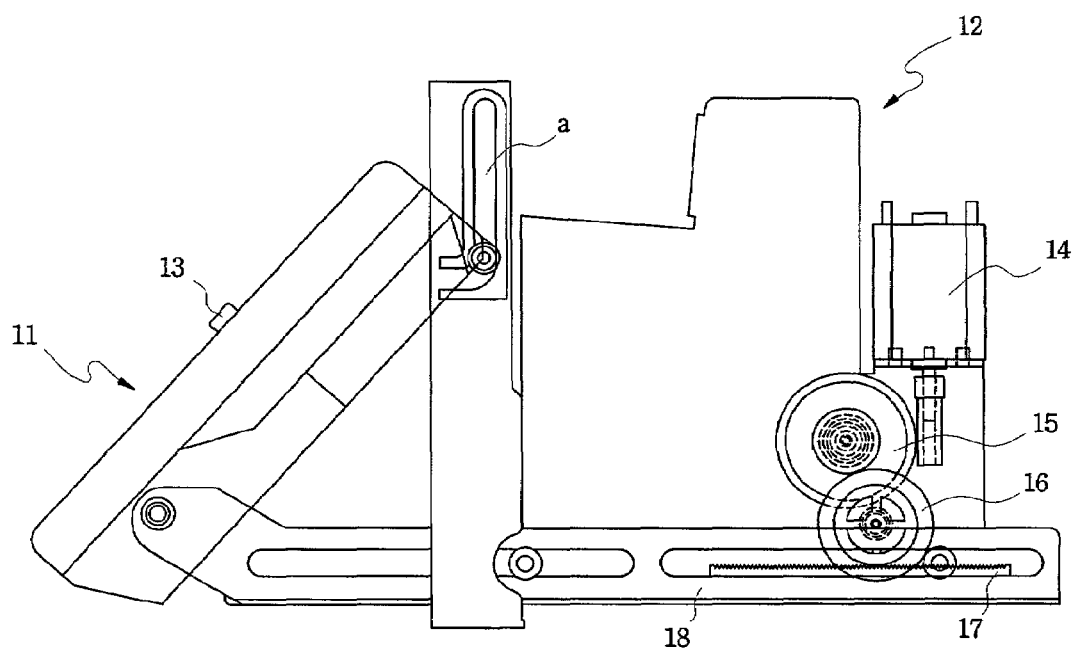
FIG. 2 is a side view showing a front panel of a conventional car audio set, which is inclined.

Reference now should be made to the drawings, in which the same reference numerals are used throughout the different drawings to designate the same or similar components.

Figure 3:
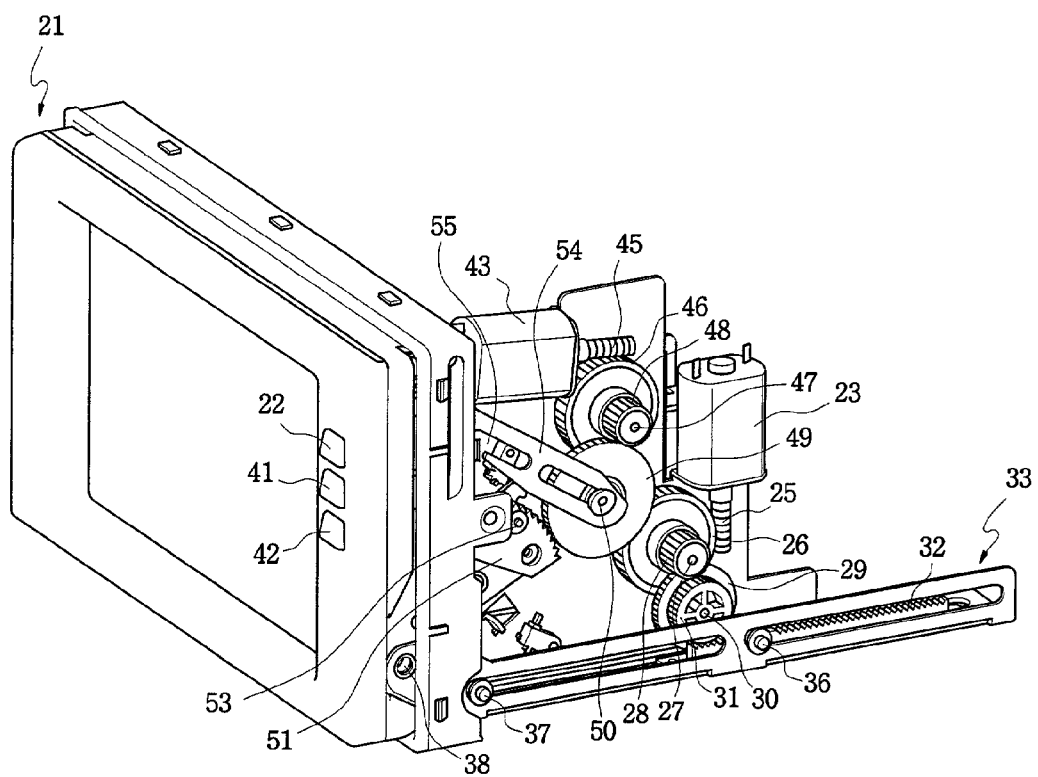
FIG. 3 is a perspective view showing an apparatus for controlling inclined angle of an AV front panel for automobile according to the invention, in which the front panel is closed.
Figure 4:
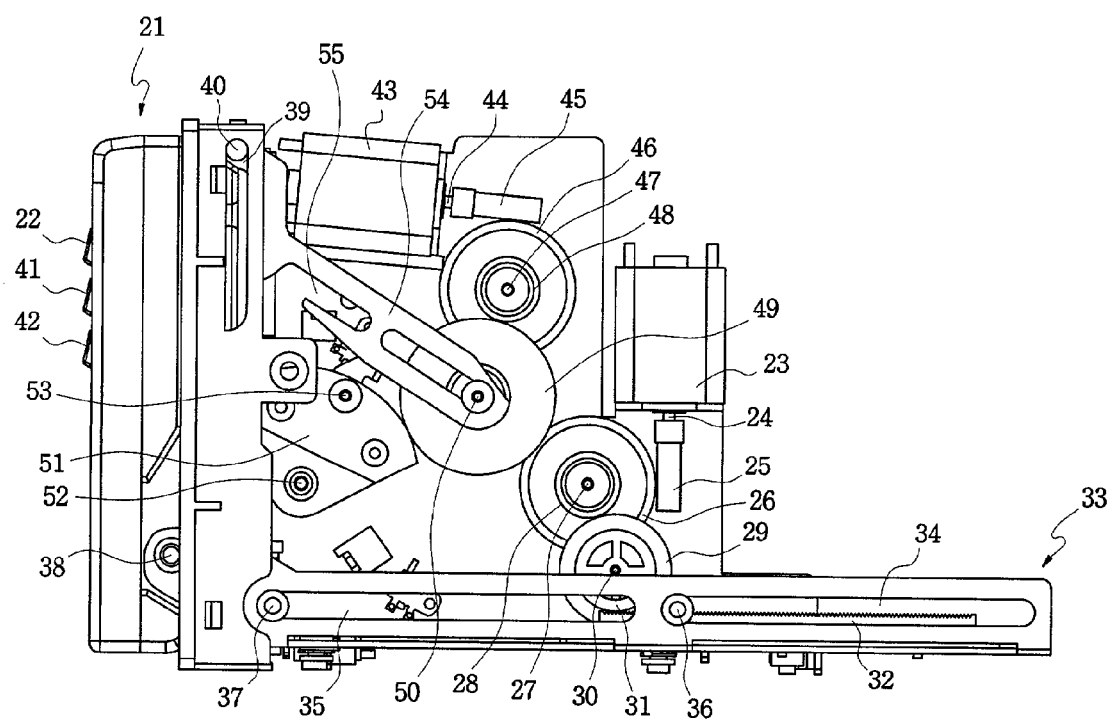
FIG. 4 is a side view of FIG. 3.
Figure 5:
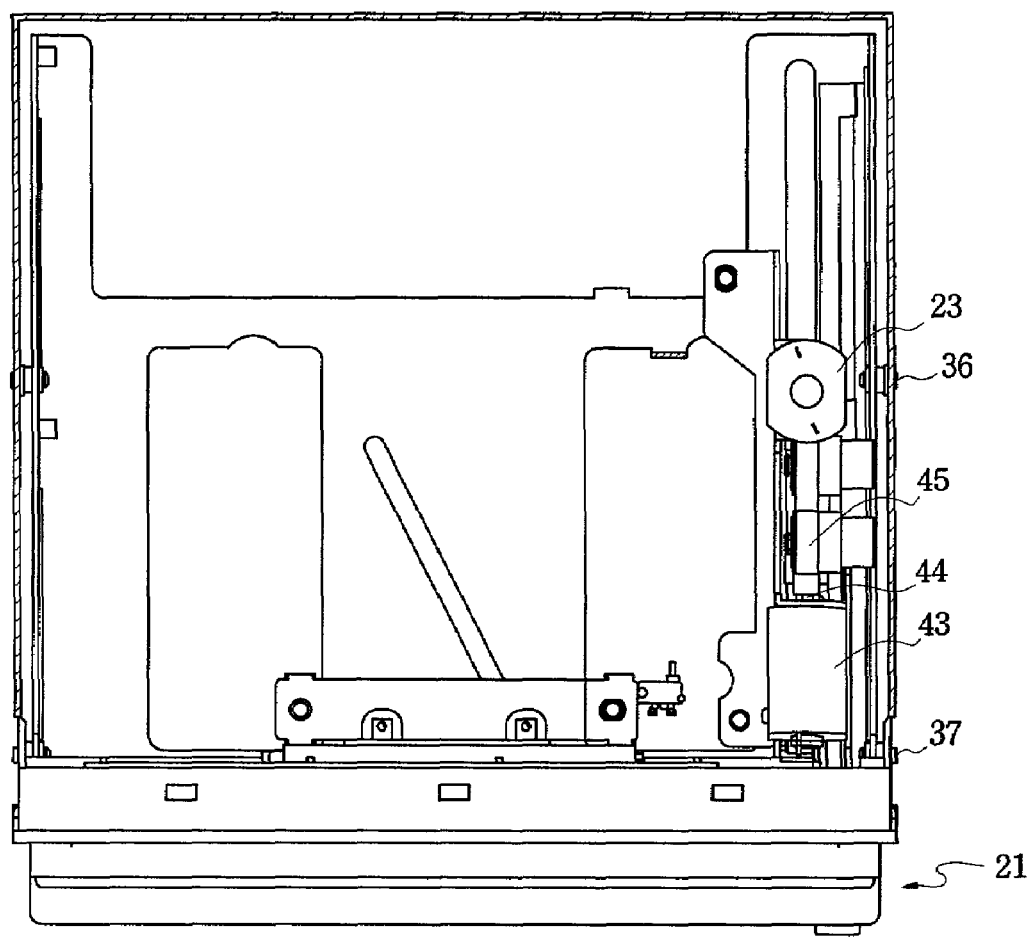
FIG. 5 is a top plan view of the FIG. 3.
Figure 6:
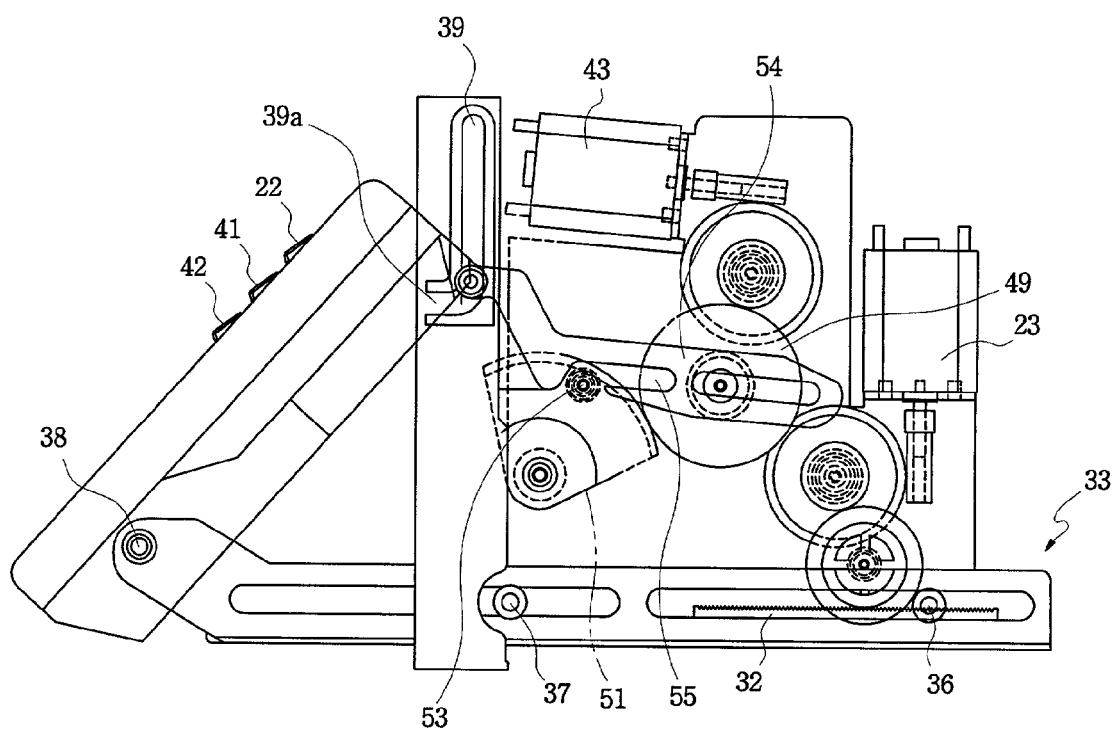
FIG. 6 is a side view showing the apparatus according to the invention, in which the front panel is inclined.
Figure 7:
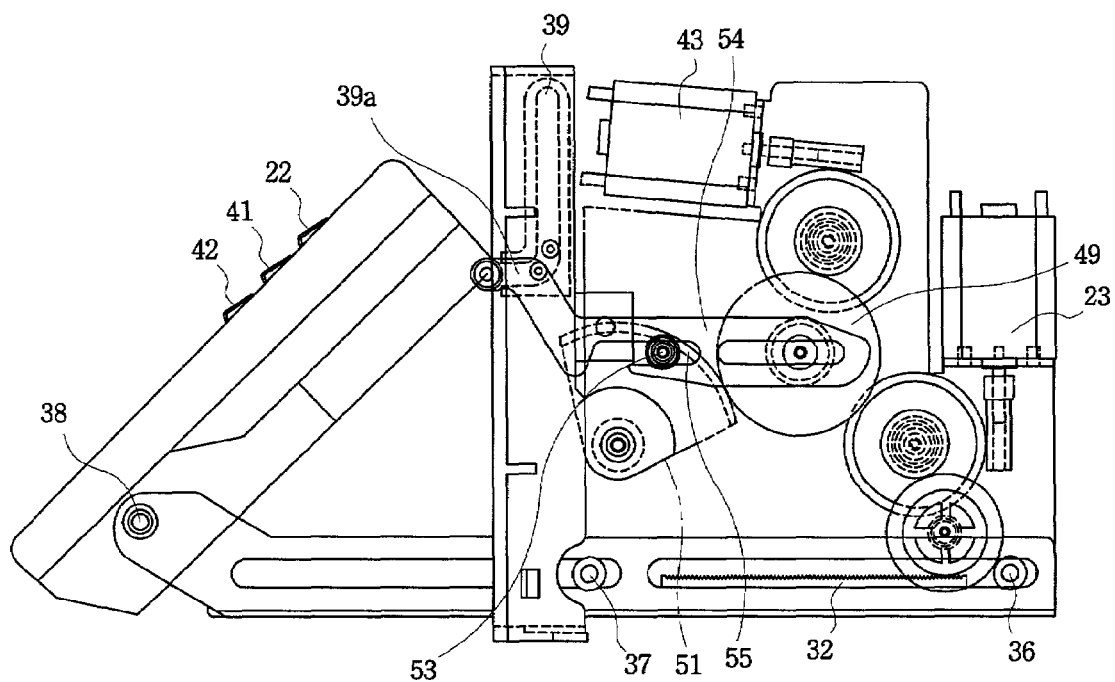
FIG. 7 is a side view showing the apparatus of FIG. 6, in which the front panel further inclined.
Figure 8:
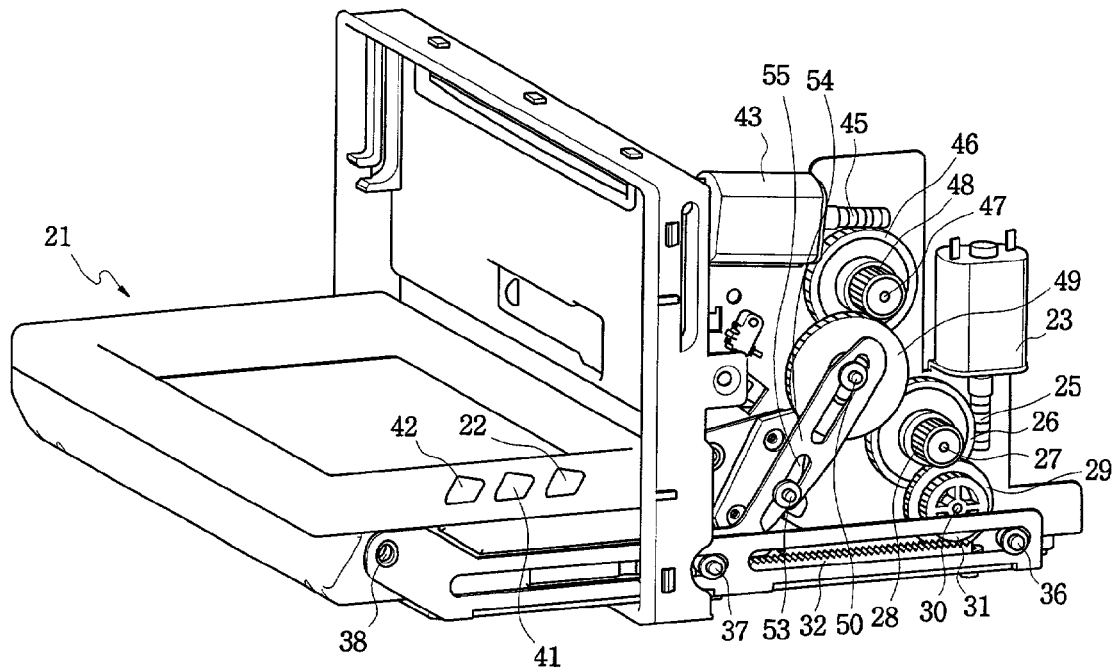
FIG. 8 is a perspective view showing the apparatus according to the invention, in which the front panel is opened.
Figure 9:
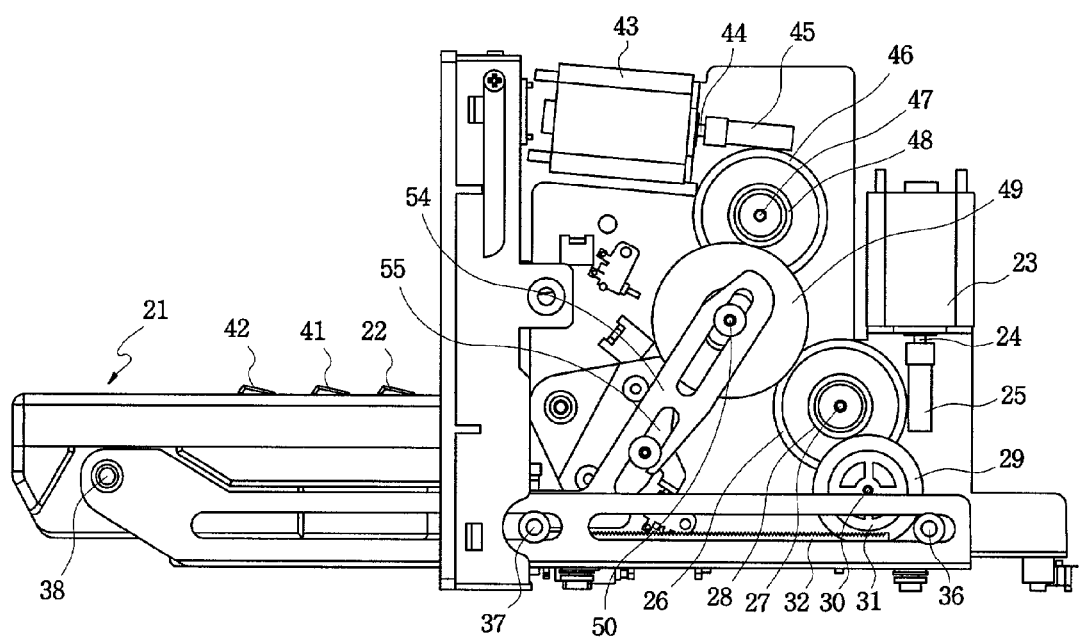
FIG. 9 is a side view of FIG. 8.
Figure 10:
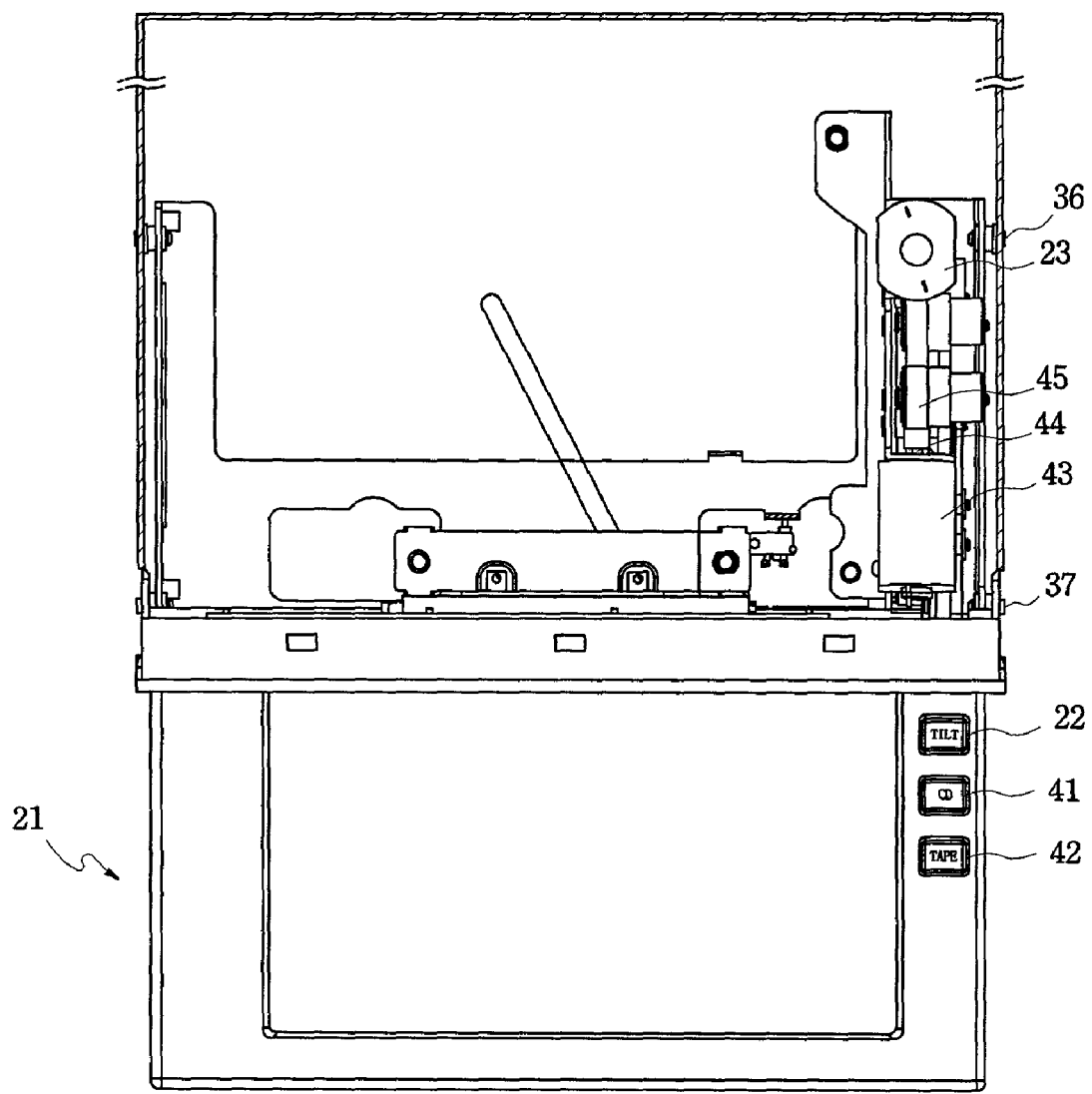
FIG. 10 is a top plan view of FIG. 8.

As illustrated in FIGS. 3 through 10, an apparatus for controlling inclined angle of an AV front panel for automobile according to the present invention includes means for inclining the front panel without a separate trajectory for inclining of the front panel, means for transmitting rotating force of a motor to the inclining means for the sake of inclination of the front panel, means for converting rotating movement of a motor into horizontal linear movement when controlling inclination angle of the front panel, and means for opening and closing the front panel as a result of the action of the inclining means, the transmitting means and the converting means.

The inclining means includes a sector gear 51.

The transmitting means includes an opening and closing motor 43, a worm 45, a worm gear 46, gear 48 and rotating gear 49 so as to rotate the sector gear 51.

The converting means includes a motor 23, a worm 25, a worm gear, a gear 28, a rotating gear 29, a pinion, a rack 32 and a slide plate 33 so as to control the front panel 21 to a desired inclined angle.

The opening and closing means is constructed such that the means is capable of opening and closing the front panel, which have been controlled to the desired inclined angle, by means of an arm link 54 for rotating the front panel 21.

The construction of the apparatus for controlling inclined angle of an AV for panel for automobile according to the invention will be now described in terms of operation procedure thereof.

Upon pushing an inclined angle controlling button 22 disposed on the front panel 21 to turn on, the inclined angle controlling motor 23 rotates in one direction. As the motor 23 rotates, the worm 25 fixed on a shaft of the motor 23 is rotated in the direction, thereby causing the worm gear 26 to be rotated counterclockwise.

Therefore, the gear 28 integrally mounted on a same shaft 27 as that of the worm gear 26 is also rotated counterclockwise.

As the gear 28 is rotated counterclockwise, the rotating gear 29 in engaged with the gear 28 is rotated clockwise and thus the pinion 31 mounted on a same shaft 30 as that of the rotating gear 29 is also rotated clockwise, thereby causing the rack 32 to be moved outward.

The slide plate 33 having the rack 32 integrally formed thereon is thus linearly moved to a certain distance while a front pin 37 and a rear pin 36 are fitted in a long front hole 35 and a rear hole 36, respectively. Therefore, the front panel 21, which is hingedly connected at its lower portion to a hinge pin 38 disposed at the outer end of the slide plate 33, is controlled in its inclined angle while trajectory pins 40 disposed at an upper part of the both sides of the front panel 21 are still in engagement in long trajectory holes 39 respectively.

Upon pushing a cassette tape-unloading button 41 or a compact disc unloading button 42 to turn on, the opening and closing motor 43 rotates in one direction.

As the opening and closing motor 43 is rotated in the direction, the worm 45 fixed to a shaft of the motor 43 is rotated in the direction to rotate the worm gear 46 engaged with the worm 45 clockwise.

The gear 48 integrally mounted on a same shaft 47 as that of the worm gear 46 is also rotated clockwise, and thus the rotating gear 49 engaged with the gear 48 is forced to be rotated counterclockwise.

With the rotating gear 49 being rotated about a rotating shaft 50 counterclockwise, the sector gear 51 of the rotating means, which is engaged with the rotating gear 49, is rotated.

As the sector gear 51 is rotated about a shaft 52 by the rotation of the rotating gear 49 of the transmitting means, a protrusion 53 formed at the periphery of the sector gear 51 may cause the arm link 54 of the opening and closing means to be rotated.

As the protrusion 53 formed on the sector gear 51 of the inclining means subsequently enters and slide into a protrusion guide 55, the arm link 54 may rotate about the rotating shaft 50 of the rotating gear 49 while the rotating shaft 50 is fitted in a long hole of the arm link 54.

After the trajectory pins 40 disposed to the upper parts of the front panel 21, which are also connected to the outer end of the arm link 54, go out of an opening 39a of the trajectory hole 39, the front panel 21 is inclined about the hinge pin 38 disposed to the outer end of the slide plate 33 and then completely laid down.

The operation of the apparatus for controlling inclined angle of an AV front panel for automobile according to the invention will be more specifically described.

The inclined angle controlling button 22 is pushed to turn on in a state of electric power on, thereby enabling the angle controlling motor 23 to rotate in one direction.

The worm 25 fixed to the shaft 24 of the motor 23 is thus rotated in the direction, thereby causing the worm gear 26 engaged therewith counterclockwise.

Subsequently, the gear 28 integrally mounted on the same shaft 27 as that of the worm gear 26 is also rotated counterclockwise.

As the gear 28 is rotated counterclockwise, the rotating gear 29 in engaged with the gear 28 is rotated clockwise.

Therefore, the pinion 31 mounted on the same shaft 30 as that of the rotating gear 29 is also rotated clockwise, thereby causing the rack 32 engaged with the rotating gear 29 to be moved outward.

With the rack 32 being moved outward, the slide plate 33 having the rack 32 integrally formed thereon is thus linearly and outward moved to a certain distance while a front pin 37 and a rear pin 36 are fitted in a long front hole 35 and a rear hole 36 respectively. Therefore, the front panel 21, which is hingedly connected at its lower portion to a hinge pin 38 disposed at the outer end of the slide plate 33, is pushed at its lower portion.

While the lower portion is pushed outward, the trajectory pins 40 disposed at an upper part of the front panel 21 are lowered while being still fitted in the long trajectory holes 39, thereby allowing the front panel 21 to be controlled in its inclined angle.

The front panel 21 is provided with a cassette tape seat therein and thus it is possible to easily access and load cassette tape into the opened cassette tape seat of the inclined front panel 21.

At this position, when the inclined angle-controlling button 22 is pushed once more to close the front panel 21, the angle controlling motor 23 is rotated in the reverse direction.

The worm 25 fixed to the shaft 24 of the motor 23 is also rotated in the reverse direction to cause the worm gear 26 to be rotated clockwise.

The gear 28 integrally formed at the same shaft 27 as that of the worm gear 26 is also rotated clockwise.

As the gear 28 is rotated clockwise, the rotating gear 29 engaged therewith is rotated counterclockwise.

The pinion 31 formed at the same shaft 30 as that of the rotating gear 29 is also rotated counterclockwise to move inward the rack 32 engaged therewith.

As the slide plate 33 having the rack 32 integrally formed thereat is moved linearly and inward while the pins 36, 37 are fitted in the long holes 34, 35, respectively, the front panel 21, which is connected at its lower both sides to the outer end of the slide plate 33 through the hinge pin 38, become upright to return the original position while the trajectory pins 40 are fitted in the long trajectory holes 39.

When it is necessary to unload the loaded cassette tape, to load a compact disc into the compact disc player, or to unload the loaded compact disc therefrom, the angle controlling button 22 is pushed to enable the angle controlling motor 23 to rotate in one direction.

The worm 25 fixed to the shaft 24 is rotated in the direction and thus the worm gear 26 engaged therewith is also rotated counterclockwise.

At the same time, the gear 28 integrally formed at the same shaft 27 as that of the worm gear 26 is also rotated counterclockwise.

As the gear 28 is rotated counterclockwise, the rotating gear 29 engaged therewith is also rotated clockwise.

The pinion 31 formed at the shaft 30 of the rotating gear 29 is also rotated clockwise to cause the rack 32 to be moved outward.

Thus, the slide plate 33 the rack 32 integrally formed thereon is linearly moved while the pins 36, 37 are fitted in the long holes 34, 35 of the slide plate 33, and at the same time the front panel 21, which is connected at its lower part to the hinge pin 38 disposed to the outer end of the slide plate 33, is laid down while the trajectory pins 40 fitted in the trajectory holes 39 are lowered, thereby allowing the inclined angle of the front panel 21 to be controlled, as mentioned above.

At this point, since the cassette tape unload button 41 or the compact disk unload button 42 is in a state of turn on, the angle controlling motor 23 is rotated few more in one direction. Hence, the slide plate 33 is further extended outward through the power transmission system, which comprises the worm 25, the worm gear 26, the gear 29, the pinion gear 31 and rack 32 from the motor 23. With the slide plate 33 being further moved outward, the trajectory pins 40 exit from the trajectory holes 39. Upon detecting the exit of trajectory pins 40 by a sensor, the angle controlling motor 23 stops in its operation.

Soon after the exit of trajectory pins 40, i.e. the front panel 43 is detected, the motor 43 is rotated in one direction.

The worm 45 fixed to the shaft 44 of the motor 43 is also rotated in the same direction, thereby causing the worm gear 46 engaged therewith to be rotated clockwise.

The gear 48, which is integrally formed at the same shaft as that of the worm gear 46, is thus rotated clockwise.

The clockwise rotation of the gear 48 may cause the gear 49 engaged therewith to be rotated counterclockwise.

Likewise, the counterclockwise rotation of the gear 49 may cause the sector gear 51 engaged therewith to be rotated clockwise.

As the sector gear 51 is rotated about the shaft 52 by the gear 49, the protrusion 53 formed at the periphery thereof enters the protrusion guide 55 of the arm link 54.

Subsequently, as the motor 43 further is rotated in the same direction, the worm gear 46, which is engaged with the worm 45, is rotated clockwise, and then the gear 49 is rotated counterclockwise, thereby causing the sector gear 51 to be rotated clockwise.

As the sector gear 51 is rotated about the shaft 52, the arm link 54 of the gear 49 is rotated about the shaft 50 while the protrusion 53 disposed at the periphery of the sector gear 51 is fitted in the protrusion guide 55.

As the arm link 54 is further rotated counterclockwise, the trajectory pin 40 of front panel 21 connected to the outer end of the arm link 54 exits from the opening 39a of the trajectory hole 39, thereby enabling the front panel 21 to be completely opened. At this point, the presence of the completely opened front panel is detected by the sensor, thereby stopping the operation of the motor 43.

When the compact disc unload button 41 or the cassette tape unload button 42 is pushed to turn on or a compact disc is loaded after a compact disk or a cassette tape is unloaded while the front panel 21 is in the opened state, the motor 43 is activated in the reverse direction.

The rotation in the reverse direction of the motor 43 may cause the worm 45 fixed the shaft 44 thereof to be rotated in the same direction. Thus, the worm gear 46 engaged with the worm 45 is rotated counterclockwise.

The gear 48 integrally formed at the same shaft 47 as that of the worm gear 46 is also rotated in the same direction.

As the gear 48 is rotated counterclockwise, the gear 49 engaged therewith is rotated clockwise.

As the gear 49 is rotated about the shaft 50 clockwise, the sector gear 51 engaged therewith is rotated counterclockwise.

Thereafter, the protrusion 53 disposed at the periphery of the sector gear 51 may force the arm link 54 to be rotated about the shaft 50 of the gear 49 clockwise, thereby causing the outer end of the arm link 54 to be raised while being engaged in the protrusion guide 55.

Since the front panel 21, which is connected at its upper part to the arm link 54, is hingedly connected at its lower part to the outer end of the slide plate 33, the front panel is somewhat closed from the completely opened position.

More specifically, as the sector gear 51 is rotated about the shaft 52 counterclockwise, the arm link 54 is rotated clockwise. Hence, the front panel 21, which is connected at its upper part to the outer end of the arm link 54, becomes gradually upright, and then the trajectory pin 40 arrives at the position just before the pin enters in the opening 39a of the trajectory hole 39. At this point, the inclination angle control of the front panel 21 is completed, and thus inclined front panel 21 is detected by a sensor(not shown), thereby stopping the rotation of the motor 43.

After the motor 43 is stopped, the motor 23 is rotated in the reverse direction.

With the opposite rotation of the motor 23, the worm 25 fixed to the shaft 24 thereof is also rotated in the reverse direction, thereby causing the worm gear 26 to be rotated clockwise.

Thus, the gear 28 integrally formed at the same shaft 27 as that of the worm gear 26 is rotated clockwise.

With the clockwise rotation of the gear 28, the gear 29 engaged therewith is rotated counterclockwise.

The pinion 31 integrally formed at the same shaft 30 as that of the gear 29 is rotated counterclockwise, and thus the rack 32 engaged therewith is moved inward.

As the slide plate 33, which has the rack 32 integrally formed thereat, is linearly moved while the pins 36, 37 are fitted in the long holes 34, 35, the trajectory pin 40 of the front panel 21 enters in the trajectory hole 39 through the opening 39a. Subsequently, the motor 23 is rotated few more in the reverse direction, and then the slide plate 33 is completely moved inward via the power transmission system comprising the worm 25, the worm gear 26, the gear 28, the rotating gear 29, the pinion 31 and the rack 32. At this point, the trajectory pins 40 of the front panel 21 are completely raised through the trajectory hole 39, and the upright position of the front panel 21 is detected by the sensor, thereby causing the motor 23 to stop.

As described above, the present invention provides an apparatus for controlling an AV front panel for automobile has advantages in that it is possible to access a seating room for receiving a recording medium with ease by opening the front panel completely, and it is possible to broaden a range of choice by adopting two decks.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus to control an inclined angle of an AV front panel with respect to an AV rear panel by means for converting a driving force of an incline angle controlling motor into a linear movement, comprising:
   an inclining unit to transfer a rotational force to the AV front panel to incline the AV front panel such that a top portion of the AV front panel inclines toward the inclining unit;
   a rotation transmitting unit to transfer a rotational force of a motor to the inclining unit to incline the AV front panel; and
   an opening and closing unit to couple with the inclining unit to open and close the AV front panel in response to a combination of the transferred rotational force of the rotation transmitting unit and the linear movement of the converting means,
   wherein the converting means includes a slide plate coupled at a first end to a base portion of the AV front panel to control a horizontal movement of the AV front panel.

2. The apparatus as set forth in claim 1, wherein the rotation transmitting unit comprises:
   a worm fixed to the motor by a shaft, such that the motor rotates the worm to open and close the front panel by rotating in first and second directions, respectively;
   a worm gear engaged with the worm and having a concentric sub-gear integrally formed there at; and
   a gear engaged with the worm gear.

3. The apparatus as set forth in claim 2, wherein the inclining unit comprises a sector gear engaged with the gear of the rotation transmitting unit and having a protrusion at its side.

4. The apparatus as set forth in claim 2, wherein:
   the opening and closing unit comprises an arm link, comprising:
   a guide hole with an opening at a first end thereof,
   a long hole to receive a shaft of the gear of the rotation transmitting unit therein such that the arm link is rotatable about the shaft and slidable on the shaft, and
   a pin hingedly connected to an upper part of the front panel; and
   the AV rear panel comprises an upright trajectory hole having an opening at its lower end such that the pin of the arm link enters the opening and slides along the upright trajectory hole.

5. An apparatus to control a movement of an AV front panel with respect to a stationary AV rear panel, comprising:
   an arm link rotatingly fixed to the AV front panel at a first end thereof to direct the movement of the AV front panel along a predetermined trajectory and to slide along a fixed axis and rotate thereabout at a second end thereof;
   an inclining unit to control a rotation of the arm link;
   a transmitting unit to transmit a first rotational force to the inclining unit; and
   a converting unit to control an angle of inclination of the AV front panel, such that a top portion of the AV front panel inclines toward the inclining unit, and comprising a slide plate coupled at a first end to a base portion of the AV front panel to control a horizontal movement of the AV front panel.

6. The apparatus of claim 5, wherein the transmitting unit comprises:
   a rotating gear to rotate in a first rotational direction to cause the inclining unit to couple to the arm link such that the arm link rotates along the fixed axis in the first rotational direction.

7. The apparatus of claim 6, wherein:
   the inclining unit comprises a rotatable sector gear with a protrusion at a periphery thereof; and
   the arm link comprises a protrusion guide to engage with the protrusion at a predetermined rotational junction of the sector gear and the arm link in order to continue the rotation of the arm link in the first rotational direction.

8. The apparatus of claim 5, wherein:
   the stationary AV rear panel comprises a trajectory hole formed along the predetermined trajectory at a side portion thereof; and
   the arm link comprises a trajectory pin to move within the trajectory hole to direct the movement of the arm link and the AV front panel.

9. The apparatus of claim 8, wherein the trajectory pin disengages from the trajectory hole at a predetermined point to allow the AV front panel to move to a position parallel to the stationary AV rear panel.

10. The apparatus of claim 5, wherein the converting unit comprises:
    a slide plate to linearly reciprocate along a horizontal axis to control the angle of inclination of the AV front panel;
    a plurality of gears to control the reciprocating movement of the slide plate; and
    a motor to transfer a second rotational force to the plurality of gears.

11. The apparatus of claim 10, wherein the horizontal axis of the slide plate is perpendicular to the AV front panel in a closed position and parallel to the AV front panel in an open position.

* * * * *